(12) United States Patent
Klein (10) Patent No.: US 7,959,182 B2
(45) Date of Patent: Jun. 14, 2011

(54) DEVICE FOR HUNTERS AND FISHERMEN

(76) Inventor: Daniel R. Klein, Macomb, MI (US)

( * ) Notice: Subject to any disclaimer, the term of this patent is extended or adjusted under 35 U.S.C. 154(b) by 237 days.

(21) Appl. No.: 12/327,443

(22) Filed: Dec. 3, 2008

(65) Prior Publication Data

US 2009/0146387 A1 Jun. 11, 2009

Related U.S. Application Data

(60) Provisional application No. 61/005,747, filed on Dec. 7, 2007.

(51) Int. Cl.
*B62B 1/20* (2006.01)

(52) U.S. Cl. .................. 280/652; 280/656; 280/47.18

(58) Field of Classification Search ................ 280/7.12, 280/7.13, 7.14, 8, 9, 10, 11, 19, 19.1, 20, 280/30, 35, 47.131, 47.17, 47.18, 47.19, 280/47.24, 47.25, 47.315, 639, 651, 652, 655, 655.1, 656, 659

See application file for complete search history.

(56) References Cited

U.S. PATENT DOCUMENTS

| | | | | | |
|---|---|---|---|---|---|
| 2,780,471 | A | * | 2/1957 | Lempke | 280/19.1 |
| 4,438,940 | A | * | 3/1984 | Hunt | 280/19.1 |
| 4,526,391 | A | * | 7/1985 | Winkelman et al. | 280/19.1 |
| 5,277,449 | A | * | 1/1994 | Schmidt | 280/655 |
| 6,139,029 | A | * | 10/2000 | Shaw | 280/8 |
| 7,284,762 | B2 | * | 10/2007 | Mehtonen | 280/19.1 |
| 7,703,795 | B2 | * | 4/2010 | Williamson | 280/656 |
| 7,775,530 | B2 | * | 8/2010 | Darling, III | 280/47.18 |

* cited by examiner

*Primary Examiner* — J. Allen Shriver, II
*Assistant Examiner* — John D Walters

(57) ABSTRACT

An apparatus for a hunter. The apparatus has a preformed body with a plurality of adjustable supports to brace the body in an upright position. The apparatus has removable wheels and is foldable for transport. It may be pulled over land or ice. Accessories are an overhead awning and a removable side skirt. The apparatus is easily assembled.

9 Claims, 10 Drawing Sheets

DEVICE FOR HUNTERS AND FISHERMEN

REFERENCE TO RELATED APPLICATION

This application is related to provisional application No. 61/005,747 filed Dec. 7, 2007.

BACKGROUND OF THE INVENTION

1. Field of the Invention

The invention relates to an apparatus to be used by hunters and fishermen and more particularly to a cart-like device which has removable wheels and a handle for cart-type use and which serves as a seat for a hunter or for use in a duck blind.

2. Description of Prior Art

Hunters and fishermen are exposed to the elements for long periods of time and the hunters/fishermen need a means to be seated and to be camouflaged from birds and animals. Folding chairs are not practical and are difficult to transport. Also needed is a means to transport decoys, equipment, food and the game which have been shot.

Most commercially available devices are a foldable chair with a camouflage cover. Transport means presently available are sleds and wheeled devices. The applicant is not aware of any devices which can serve both functions.

SUMMARY

It is an object of the present invention to provide a single apparatus which can serve to transport a hunter's equipment, haul the hunter's kill and also serve as a seat for the hunter and have a camouflage covering to screen the hunter.

In accordance with the teachings of the present invention, there is disclosed an apparatus for a hunter, comprising a wheeled cart for hauling a kill, such as a deer's carcass. The cart has a preformed body with walls surrounding a base. The body has a forward end and a rearward end and a member articulatable relative to the cart at the forward end thereof. The cart may be positioned substantially vertical with the member at an acute angle thereto to brace and support the cart, such that the hunter may sit in the cart, using the rearward end of the cart as a chair, or using the cart as part of a duck blind, thereby providing a single piece of equipment useful as a cart or sled, a chair and a blind. The member also serves as a handle to pull or push the cart.

These and other objects of the present invention will become apparent from a reading of the following specification taken in conjunction with the enclosed drawings.

DESCRIPTION OF THE PREFERRED EMBODIMENTS

Referring to FIGS. 1-4, the body 10 of the apparatus has a base 12 with walls 14 surrounding the base 12. A plurality of longitudinal ribs 16 are formed on the base 12 to provide strength to the base. The wall 14 on the forward end 18 of the body is formed at an acute angle (approximately 25°) with respect to the base 12. The top surfaces of the side walls are at a greater distance from the base near the forward end 18 and near the rearward end 20 than in the center of the respective side walls. It is preferred that the body be decorated or colored with a camouflage pattern.

As shown in FIGS. 5-9, an axle is attached to the rearward end 20 of the body and a pair of wheels 22 are removably received on the axle. It is preferred that the wheels be twenty inch airless foam composite. A first member 24 is attached to the forward end 18 of the body 10, the first member being articulatable with respect to the body. Preferably, the first member 24 is u-shaped with two substantially parallel arms. Each arm is pivotably connected to an opposite side of the body 10. The cart may be positioned substantially vertically with the first member at an acute angle thereto to brace and support the body such that a hunter may sit in the body using the rearward end of the body as a seat of a chair.

If desired, a second member 26, preferably u-shaped is nested between the wheels 22, at the rearward portion of the body 10. The second member 26 is articulatable with respect to the body 10. The second member provides a second brace when the cart is placed in a vertical position with the rearward end proximal to the ground. This positioning is used when the cart is disposed in a chair or duck blind position.

To provide greater stability, a third member 28, preferably u-shaped may be articulatably connected to the rearward end 20 of the body 10. Each arm of the u-shaped member is pivotally connected to an opposite side of the body 10.

A cushion 30, preferably formed from a plastic foam, is attached to the base 12 and the wall of the body which forms the rearward end 20 of the body. The cushion serves as a seat for the hunter when the body is in the chair or duck blind position. In cold weather the foam cushion provides insulation for the hunter.

Figure 1:
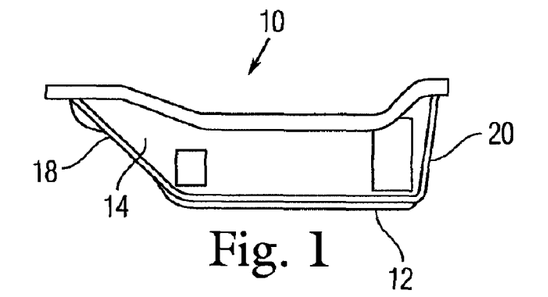
FIG. 1 is a side view of the body of the apparatus.
Figure 2:
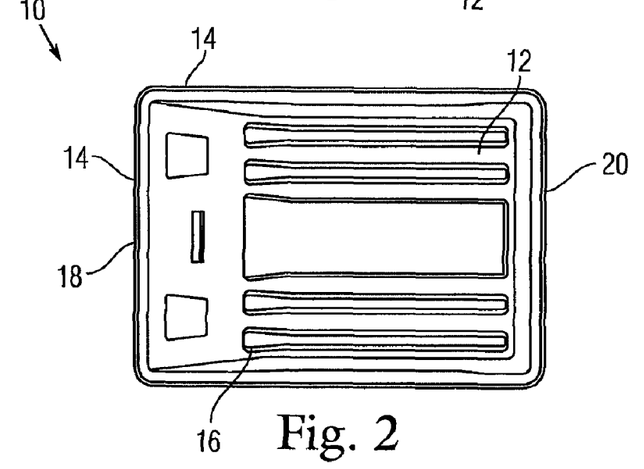
FIG. 2 is a top view of the body of the apparatus.
Figures 3, 4:
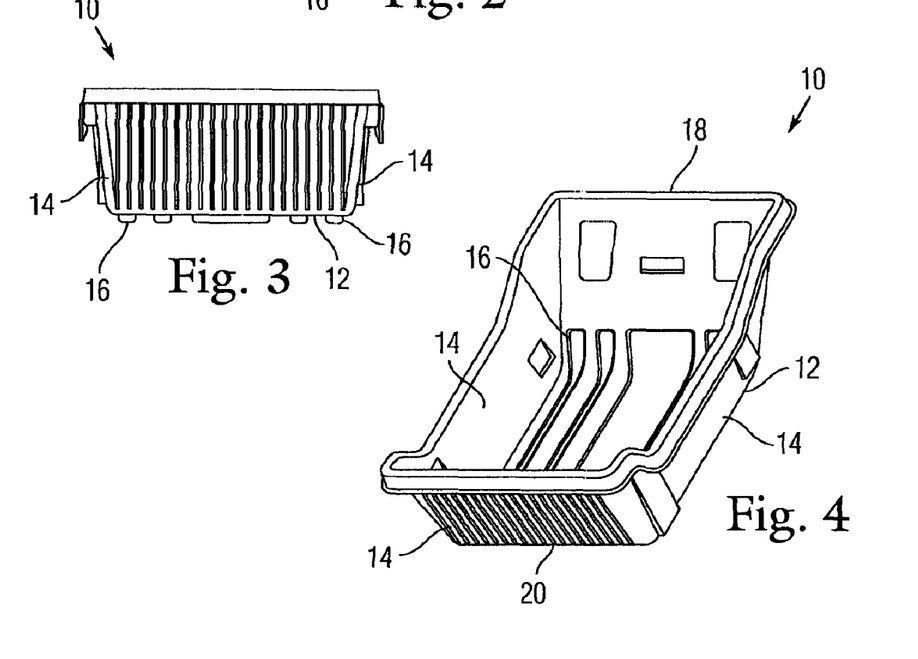
FIG. 3 is a view of the rearward end of the apparatus.
FIG. 4 is a perspective view of the top of the apparatus.
Figure 5:
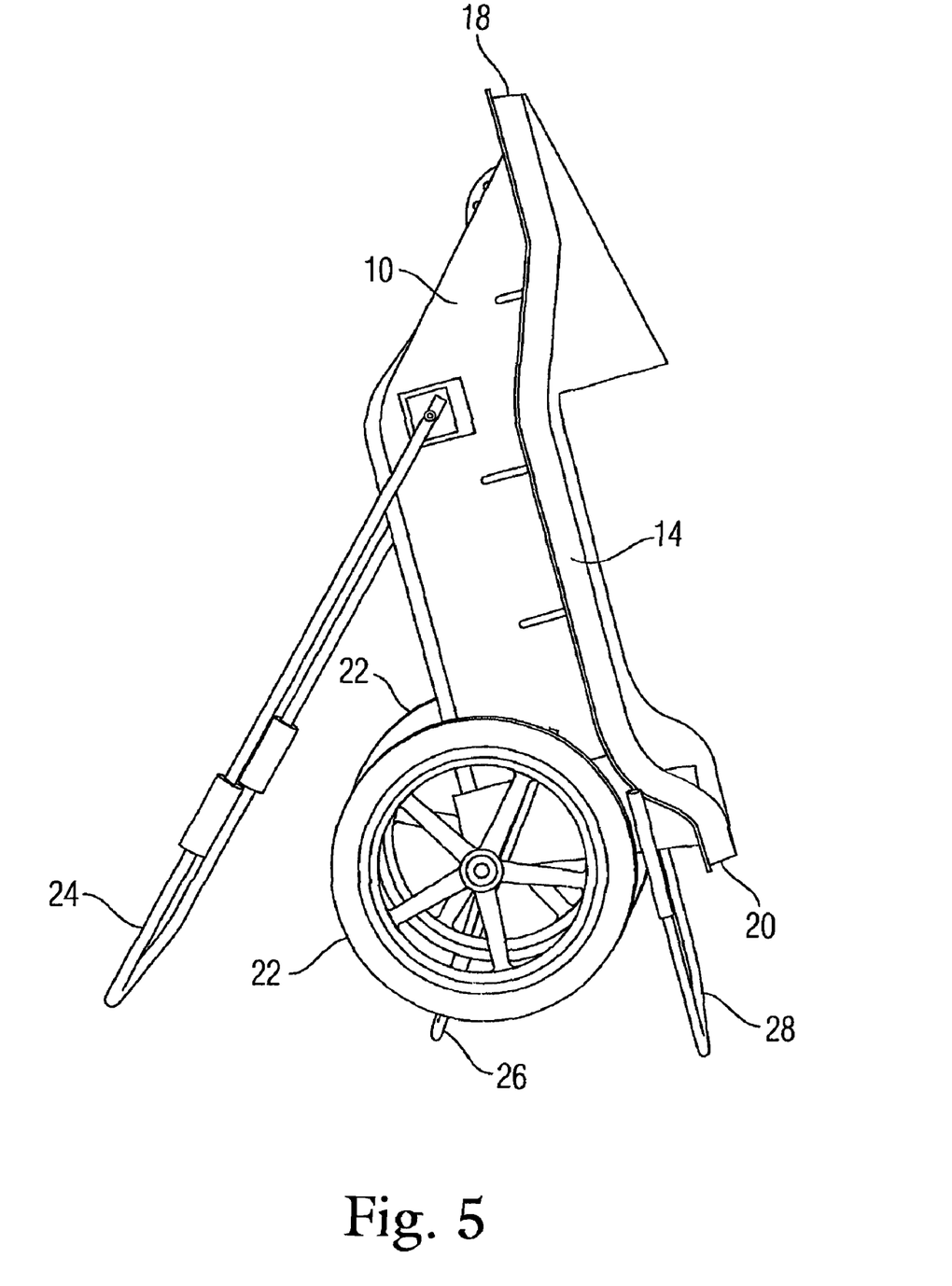
FIG. 5 is a side view of the apparatus standing in a vertical position.
Figure 6:
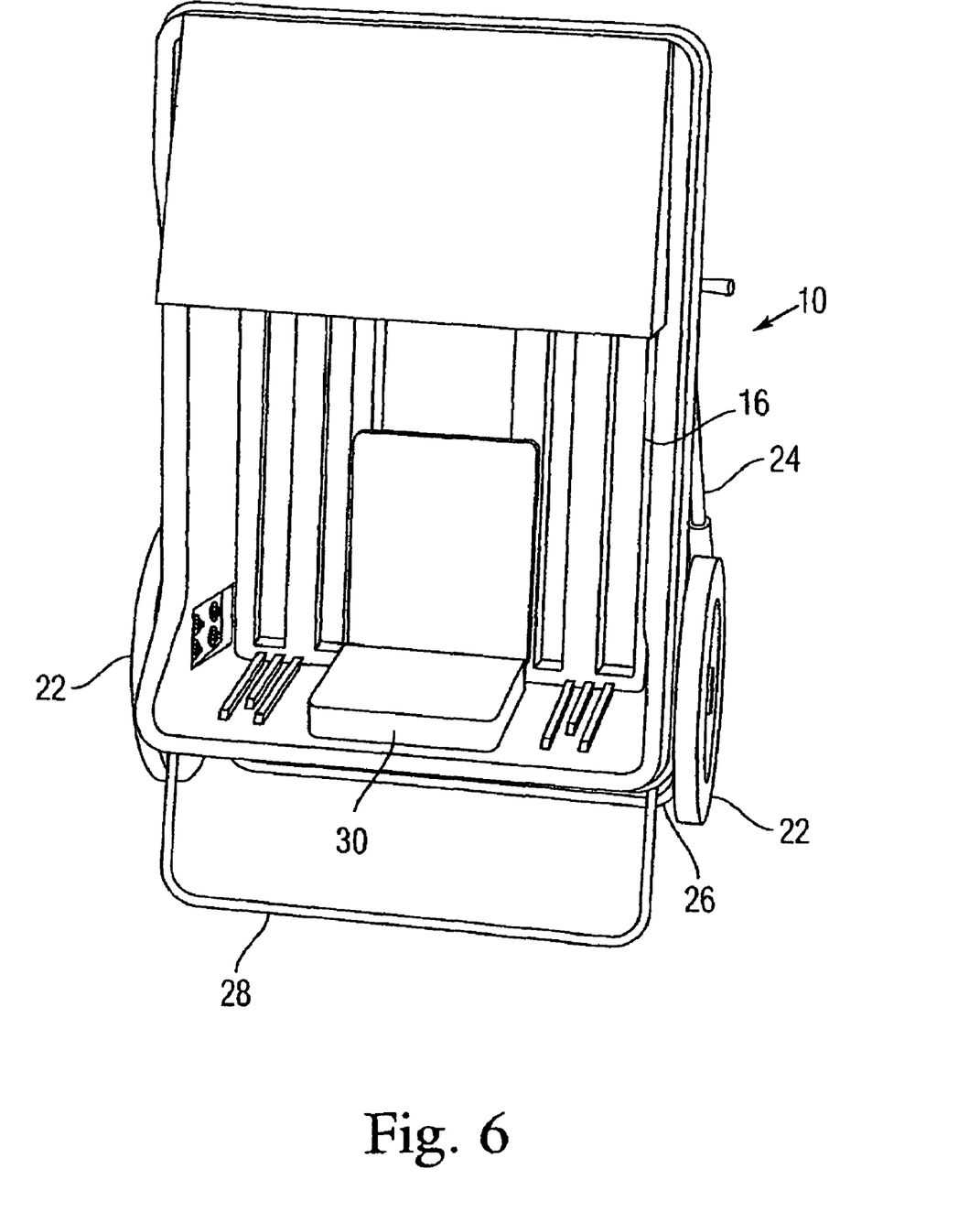
FIG. 6 is a front view of the apparatus standing in a vertical position.
Figure 7:
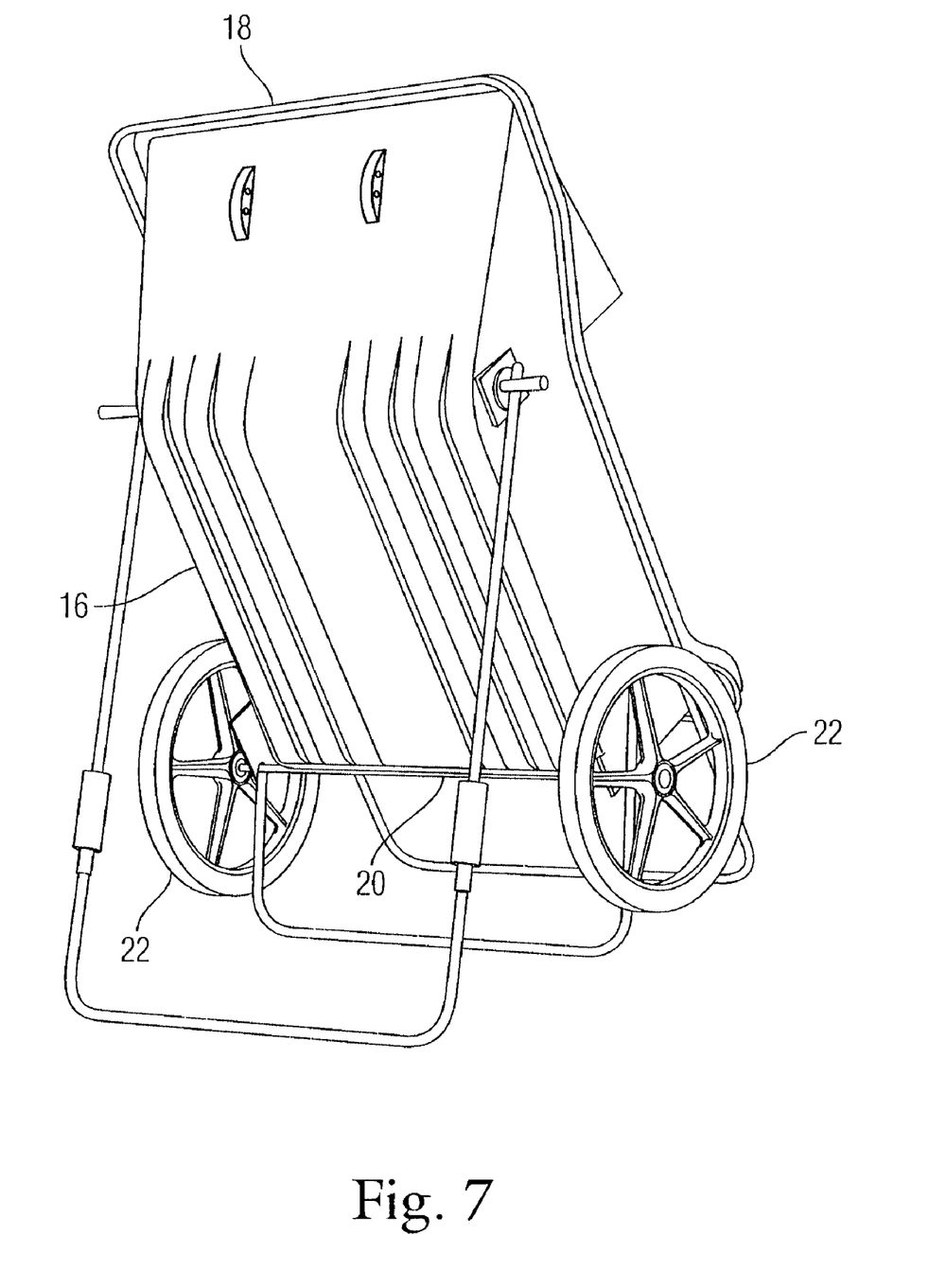
FIG. 7 is a perspective rear view of the apparatus standing in a vertical position.
Figure 8:
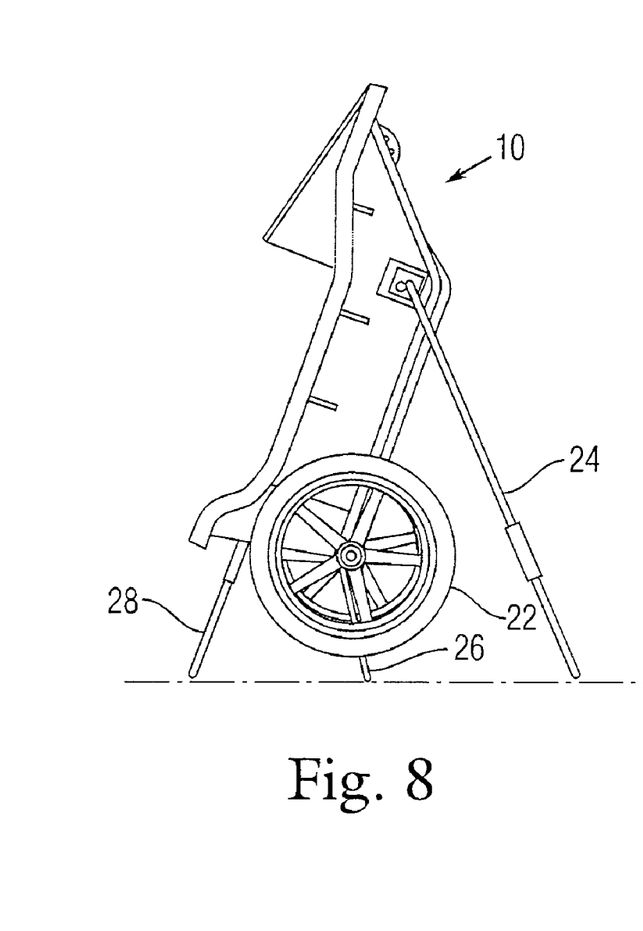
FIG. 8 is a side view of the apparatus with the members partially extended.
Figure 9:
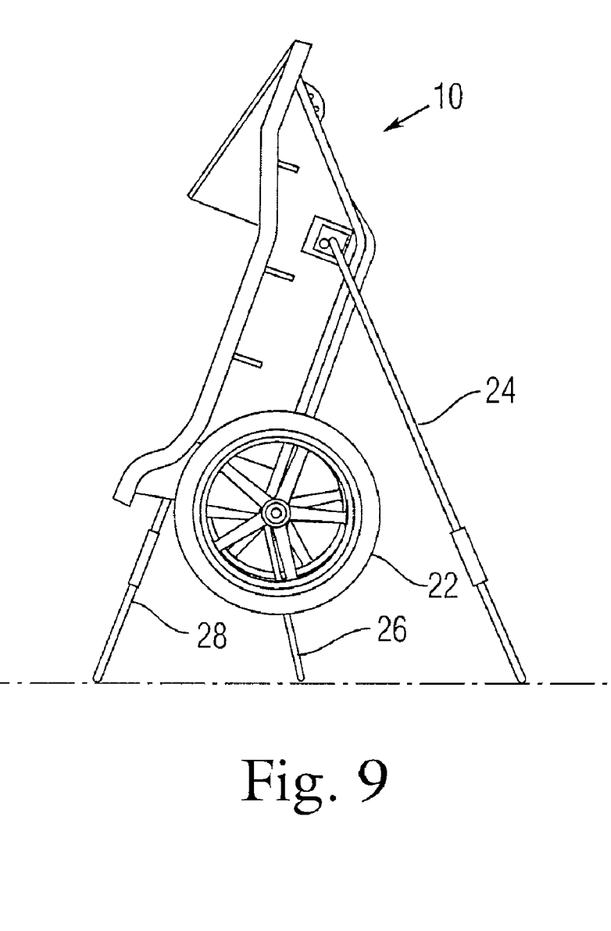
FIG. 9 is a side view of the apparatus with the members fully extended.

As shown in FIGS. 8 and 9, the first, second and third members are adjustable in length. The members may be formed of telescoping sections which are incrementally adjustable to accommodate hunters of varying heights. Preferably, the members are formed from aluminum.

Figure 10:
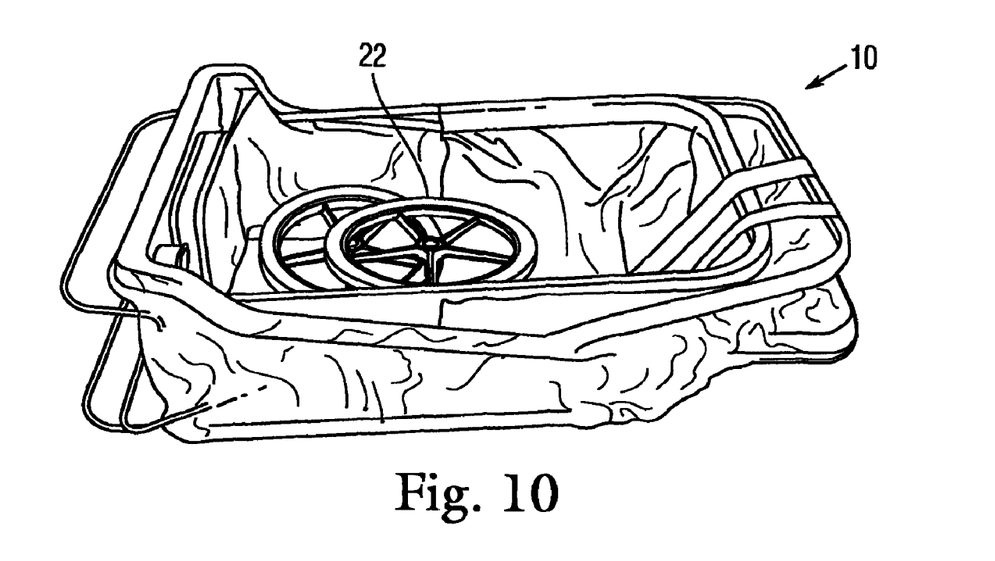
FIG. 10 is a perspective view of the disassembled apparatus with the member folded adjacent to the body and the wheels within the body.
Figure 11:
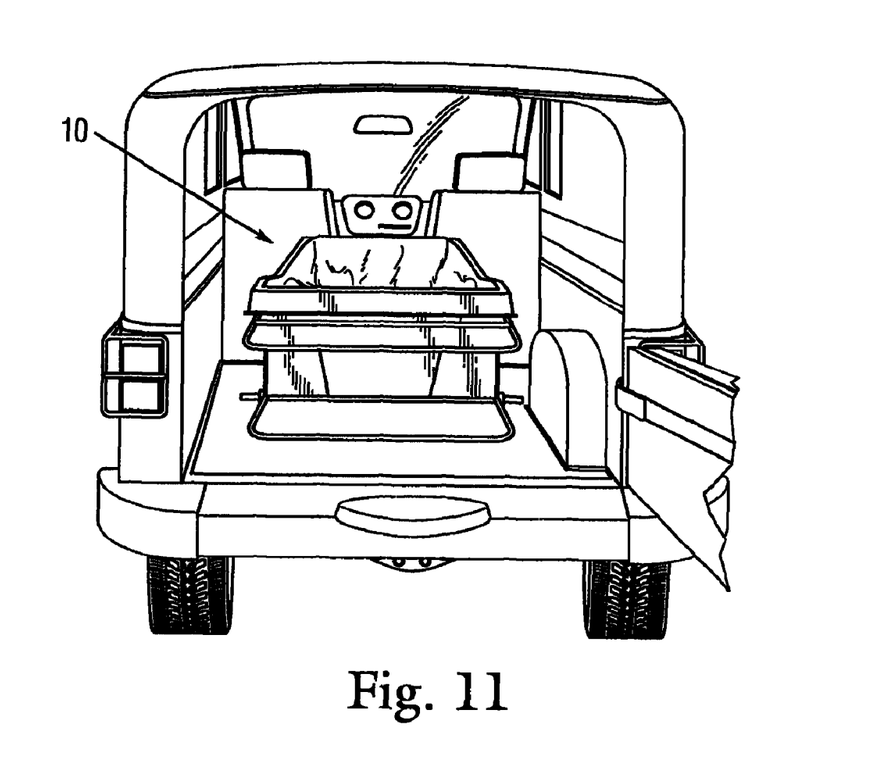
FIG. 11 is a perspective view showing the disassembled apparatus loaded in the back of a vehicle.

The apparatus may be disassembled and compactly folded as shown in FIG. 10. The wheels 22, may be removed and stored in the body 10. The articulatable members 24, 26, 28 are first member being articulatable with respect to the body. Preferably, the first member 24 is u-shaped with two substantially parallel arms. Each arm is pivotably connected to an opposite side of the body 10. The cart may be positioned substantially vertically with the first member at an acute angle thereto to brace and support the body such that a hunter may sit in the body using the rearward end of the body as a seat of a chair.

Figure 12:
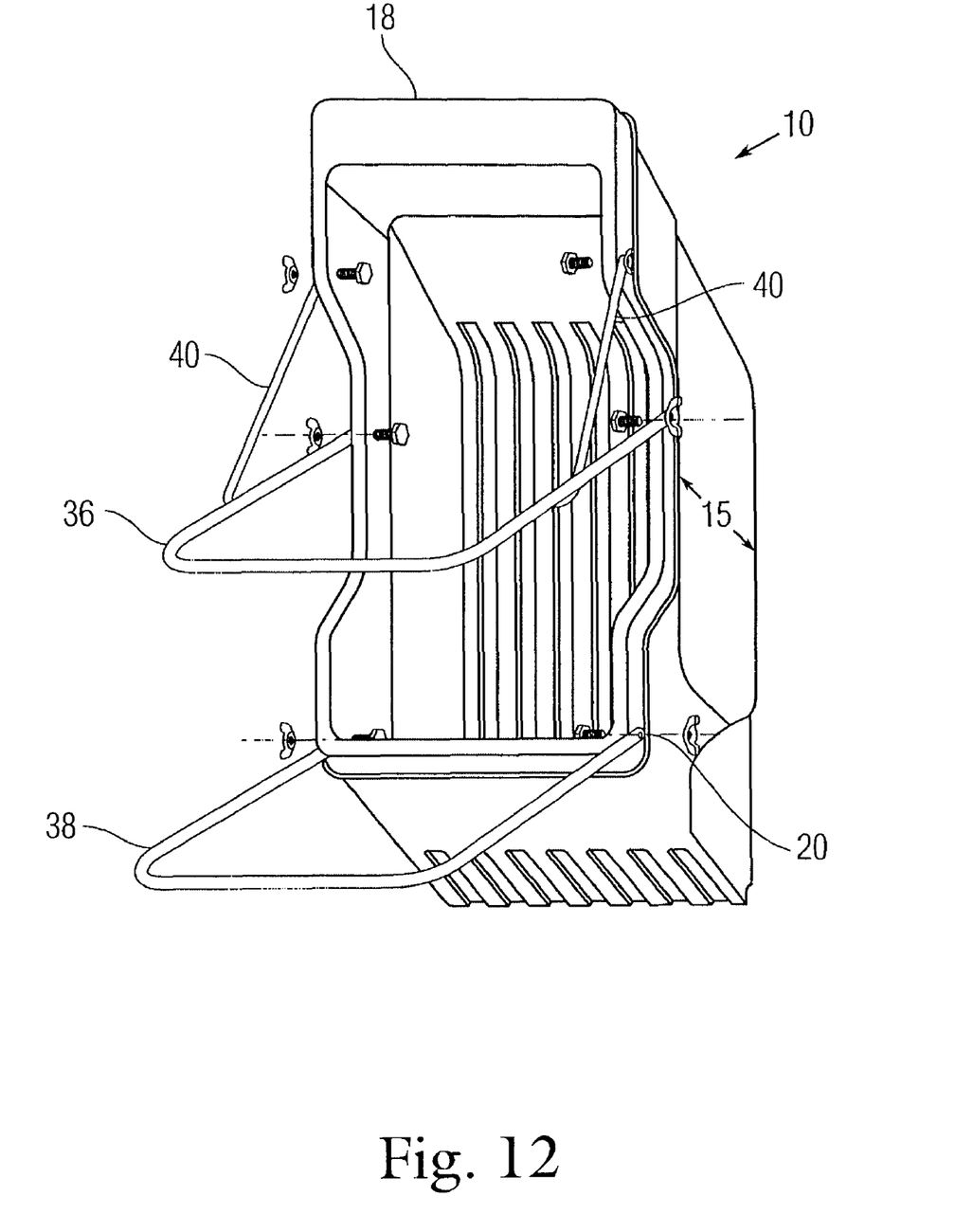
FIG. 12 is a perspective view showing supports on the body to which a side skirt is attached.
Figure 13:
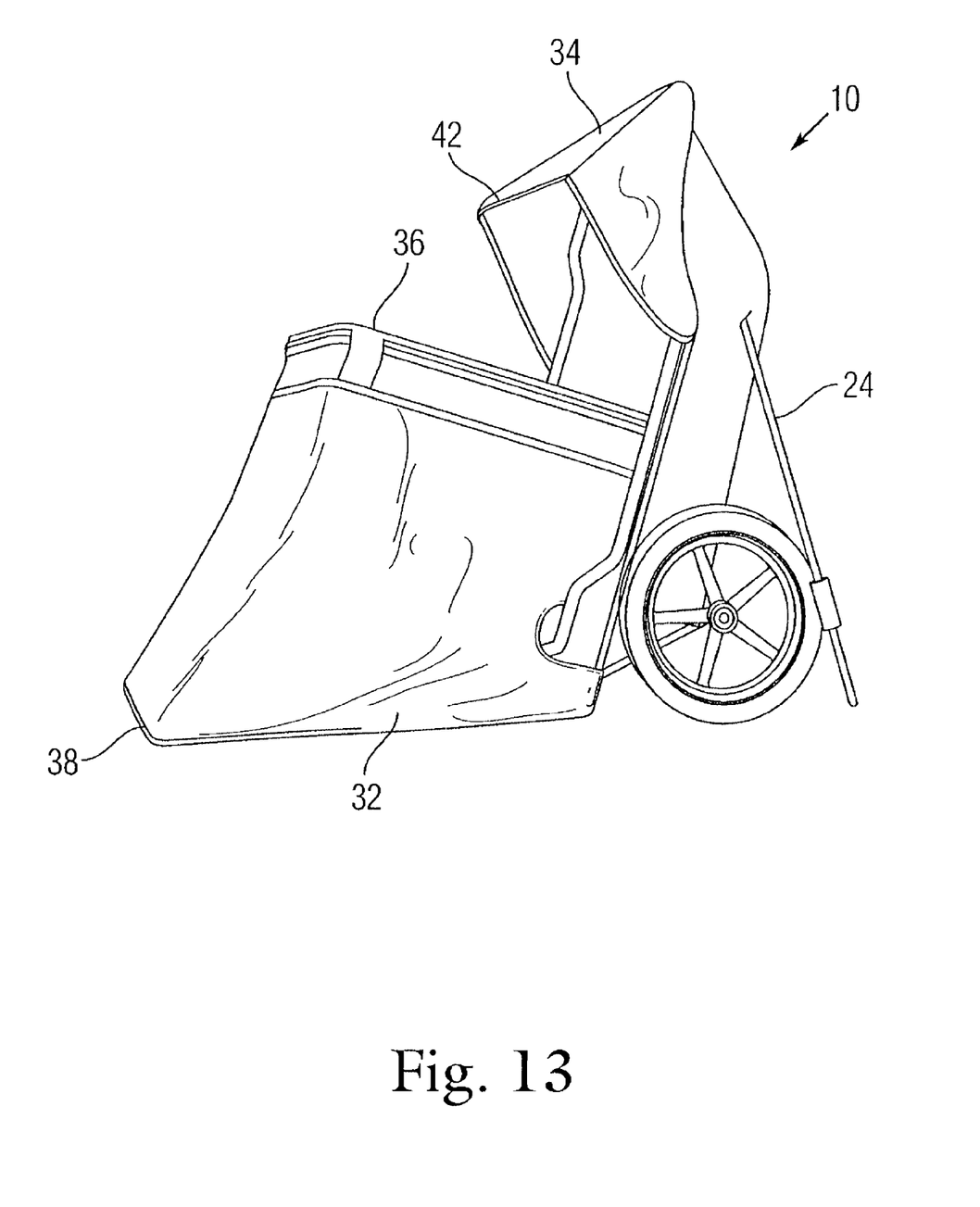
FIG. 13 is a side view showing supports having a camouflaged overhead awning and a camouflaged side skirt.

Accessories for the apparatus include a side skirt 32 and an overhead awning 34. As shown in FIG. 12, a top bar 36 for the skirt 32 is a u-shaped frame with the ends of the legs of the frame connectable to the front of the body 10 approximately midway between the forward end 18 and the rearward end 20 of the body. A bottom bar 38 for the skirt 32 is a second u-shaped frame with the ends of the legs of the frame connectable to the rearward end 20 of the body. Each leg of the top bar 36 has one end of a resilient member 40 connected thereto. The opposite end of the resilient member 40 is connected to the body 10 near the forward end 18. The resilient member may be a ¼ inch marine grade bungee. A fabric skirt 32 is removably attached between the top bar 36 and the bottom bar 38. The resilient members 40 support the top bar 36 so that the skirt always hangs vertically around the front of the body 10 to protect the hunter seated on the body from inclement weather. The skirt preferably has a camouflage pattern formed thereon to reduce the visibility of the apparatus (FIG. 13).

The overhead awning 34 has a u-shaped frame 42 with the ends of the arms of the frame connectable to the body 10 of the apparatus. The awning is formed from fabric which is connected to the frame 42 and to the forward end 18 of the body. Preferably, the fabric has a camouflage pattern formed thereon to reduce the visibility of the apparatus. The awning may be folded downwardly to provide shade for the hunter seated within the apparatus. In inclement weather the awning reduces the amount of rain or snow which enters the body 10 of the apparatus.

Figure 14:
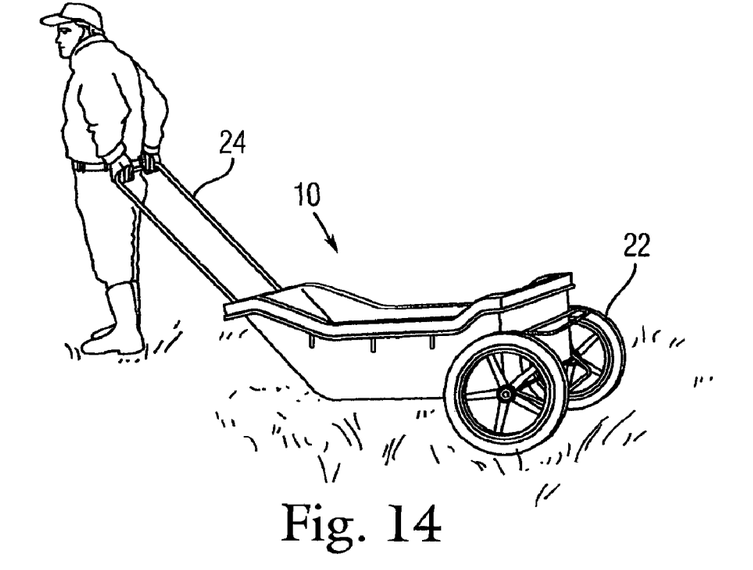
FIG. 14 is a perspective view showing the apparatus being pulled by a hunter.

Another feature of the apparatus is the ability to use the first member 24 as a handle to pull or push the apparatus (FIG. 14). With the wheels attached to the rearward end of the body, the apparatus may be moved over almost any type of terrain. The adjustable length of the first member enables persons of differing heights to adjust the length to a convenient length. When the apparatus is being pulled, the body may be used to hold decoys or the hunter's kill such as a deer or birds. If the wheels are removed, the apparatus can be pulled as a sled and can even be pulled over ice.

Figure 15:
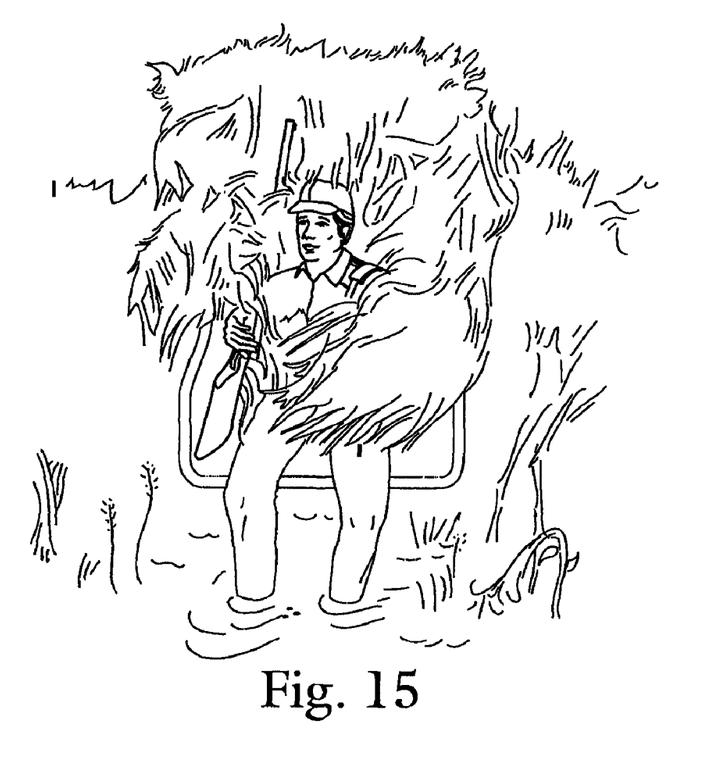
FIG. 15 is a front view of a hunter sitting in the apparatus with grass and bushes attached to the apparatus as camouflage.
Figure 16:
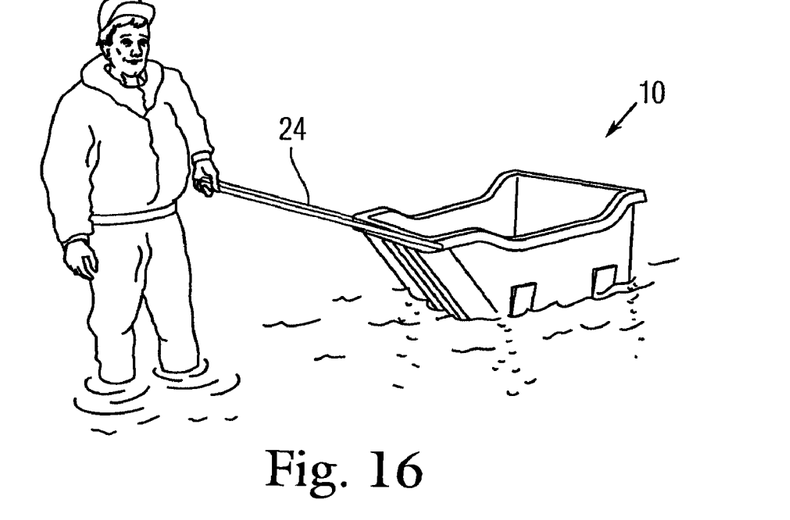
FIG. 16 is a perspective view of the apparatus floating on a body of water.
Figure 17:
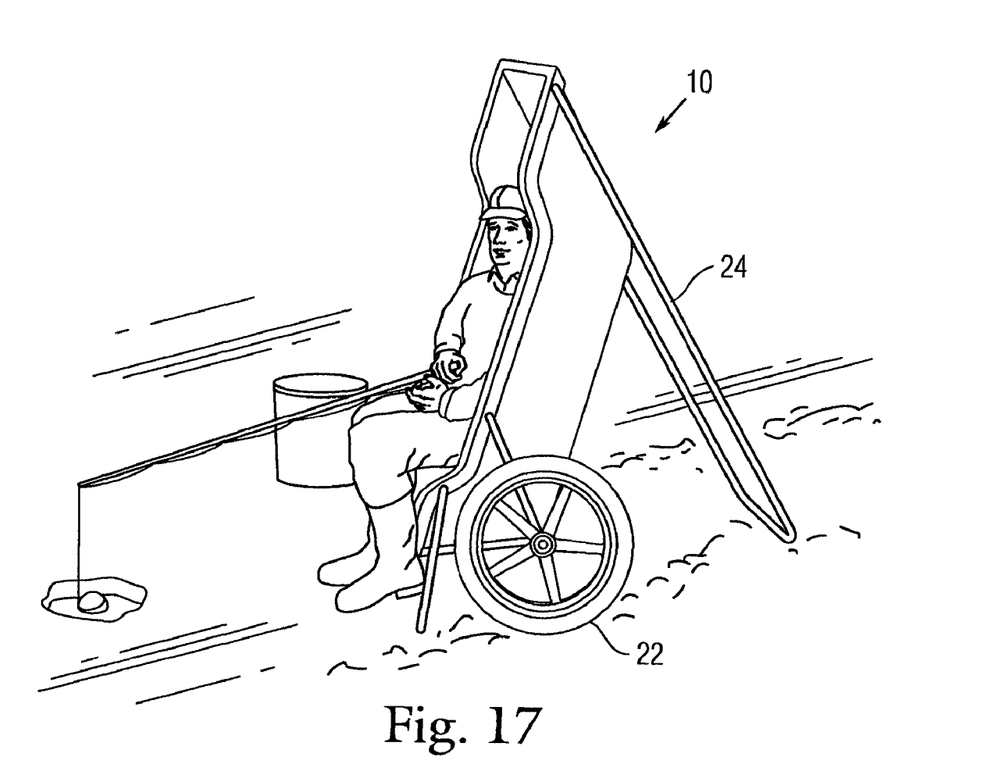
FIG. 17 is a perspective view of the apparatus used for fishing on a frozen body of water.

In the field, grass, tree branches and other natural vegetation may be attached to the apparatus as shown in FIG. 15 to make the apparatus less visible to animals and birds. The apparatus is taken to a selected location and the apparatus is set up by adjusting the members to a desired length. The versatile apparatus may be set up as a duck hunting blind, a coffin blind for hunting geese or a blind for deer hunters. The apparatus may be set up on land, in a marsh and may even be floated in water to reach shallow water where most duck boats cannot go (FIG. 16). Still a further use is for ice fishing (FIG. 17).

The present invention is an all season, all weather versatile transformer that serves as a gear and game hauling cart that can be configured with ease as a full scale hunting blind or fishing shanty with built in seating. The waterproof device is constructed of environmentally safe materials and can be used on land, in the marsh or on ice.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. An apparatus for a hunter, comprising a cart for hauling a kill, the cart having a preformed body with walls surrounding a base, the body having a forward end and a rearward end, a member articulatable relative to the body at the forward end thereof, such that the cart may be positioned substantially vertical with the member at an acute angle thereto to brace and support the cart, such that the hunter may sit in the cart, using the rearward end of the cart as a chair, or using the cart as part of a duck blind, thereby providing a single piece of equipment useful as a cart or sled, a chair and a blind and further wherein the member also serves as a handle to pull or push the cart, wherein the cart has a pair of wheels removably disposed at its rearward portion, and wherein the handle is substantially u-shaped and is pivotably mounted to the forward portion of the cart, further including a second u-shaped member, nested between the wheels at the rearward portion of the cart and articulatable relative thereto, thereby providing a second brace when the cart is moved into its chair or duck blind position.

2. The apparatus of claim 1, wherein the cart, at least in its unloaded position, is capable floating on a body of water.

3. The apparatus of claim 1, wherein the apparatus may be folded to be transportable in a motor vehicle.

4. The apparatus of claim 1, wherein the cart has a plurality of members articulatably connected to the body, each of the members having means to incrementally adjust the length of each respective member.

5. The apparatus of claim 1, further having an overhead awning removably attachable to the forward end of the cart wherein, when the cart is positioned vertically, the overhead awning provides shade and protection from inclement weather to the hunter seated in the cart.

6. The apparatus of claim 1, further having a side skirt removably attachable to the rearward end of the cart, the side skirt being formed from a fabric having a camouflage design, wherein, when the cart is positioned vertically, the side skirt protects the hunter seated in the cart from inclement weather and reduces visibility of the apparatus.

7. The apparatus of claim 1, wherein the rearward end of the cart has one of the walls formed approximately vertically with respect to the base, a foam cushion being attached to said wall wherein, when the cart is positioned vertically, the foam cushion serves as a seat for the hunter and insulates the hunter in cold weather.

8. The apparatus of claim 1, wherein a plurality of spaced-apart ribs are formed on the base of the cart, the ribs increasing the strength of the cart and also serving as runners when the cart is moved over snow or ice.

9. An apparatus for a hunter, comprising a cart for hauling a kill, the cart having a preformed body with walls surrounding a base, the body having a forward end and a rearward end, a member articulatable relative to the body at the forward end thereof, such that the cart may be positioned substantially vertical with the member at an acute angle thereto to brace and support the cart, such that the hunter may sit in the cart, using the rearward end of the cart as a chair, or using the cart as part of a duck blind, thereby providing a single piece of equipment useful as a cart or sled, a chair and a blind and further wherein the member also serves as a handle to pull or push the cart, wherein the cart has a pair of wheels removably disposed at its rearward portion, and wherein the handle is substantially u-shaped and is pivotably mounted to the forward portion of the cart, further including another u-shaped member connected to the rearward portion of the cart above the wheels and articulatable relative thereto, providing a third brace when the cart is moved into its chair or duct blind position.

* * * * *